United States Patent [19]

Popeil et al.

[11] 4,065,115
[45] Dec. 27, 1977

[54] FOLDABLE CUTTING BOARD

[75] Inventors: Samuel J. Popeil; Lorenzo Anthony Ruiz, both of Chicago, Ill.

[73] Assignee: Popeil Brothers, Inc., Chicago, Ill.

[21] Appl. No.: 749,606

[22] Filed: Dec. 13, 1976

Related U.S. Application Data

[62] Division of Ser. No. 683,479, May 5, 1976, Pat. No. 4,015,330.

[51] Int. Cl.² .......................................... A47J 47/00
[52] U.S. Cl. ..................................................... 269/16
[58] Field of Search ...................... 269/15, 16; 30/124, 30/269 R; 248/37.3

[56] References Cited

U.S. PATENT DOCUMENTS

| 864,833 | 9/1907 | Creque | 269/16 |
|---|---|---|---|
| 1,223,161 | 4/1917 | Fazzini | 269/16 |
| 1,365,147 | 1/1921 | Berwick | 269/15 |
| 3,598,164 | 8/1971 | August | 269/15 |
| 3,926,419 | 12/1975 | Kenny | 269/16 |

Primary Examiner—Jimmy C. Peters
Attorney, Agent, or Firm—Dominik, Knechtel, Godula & Demeur

[57] ABSTRACT

A cutting board case and knife set is shown in which the cutting board comprises two halves, folded along a center line, and secured together by means of a sliding bolt type latch. The two halves are hinged, and each half has a knife handle recess which accommodates one half of the handle of the knife, the cutting blade extending longitudinally adjacent the center fold portion of the cutting board. The two halves of the cutting board, when folded together, have a releasable lock and provision may be made for a hanging handle, and also for stopper buttons on the base used to secure the same against dislodgement. The forward end of the cutting board is tapered, and the preferred knife handle is kidney shaped with a flat base for guiding the same along the cutting board, a finger guide at its forward portion, and a central open grip.

19 Claims, 10 Drawing Figures

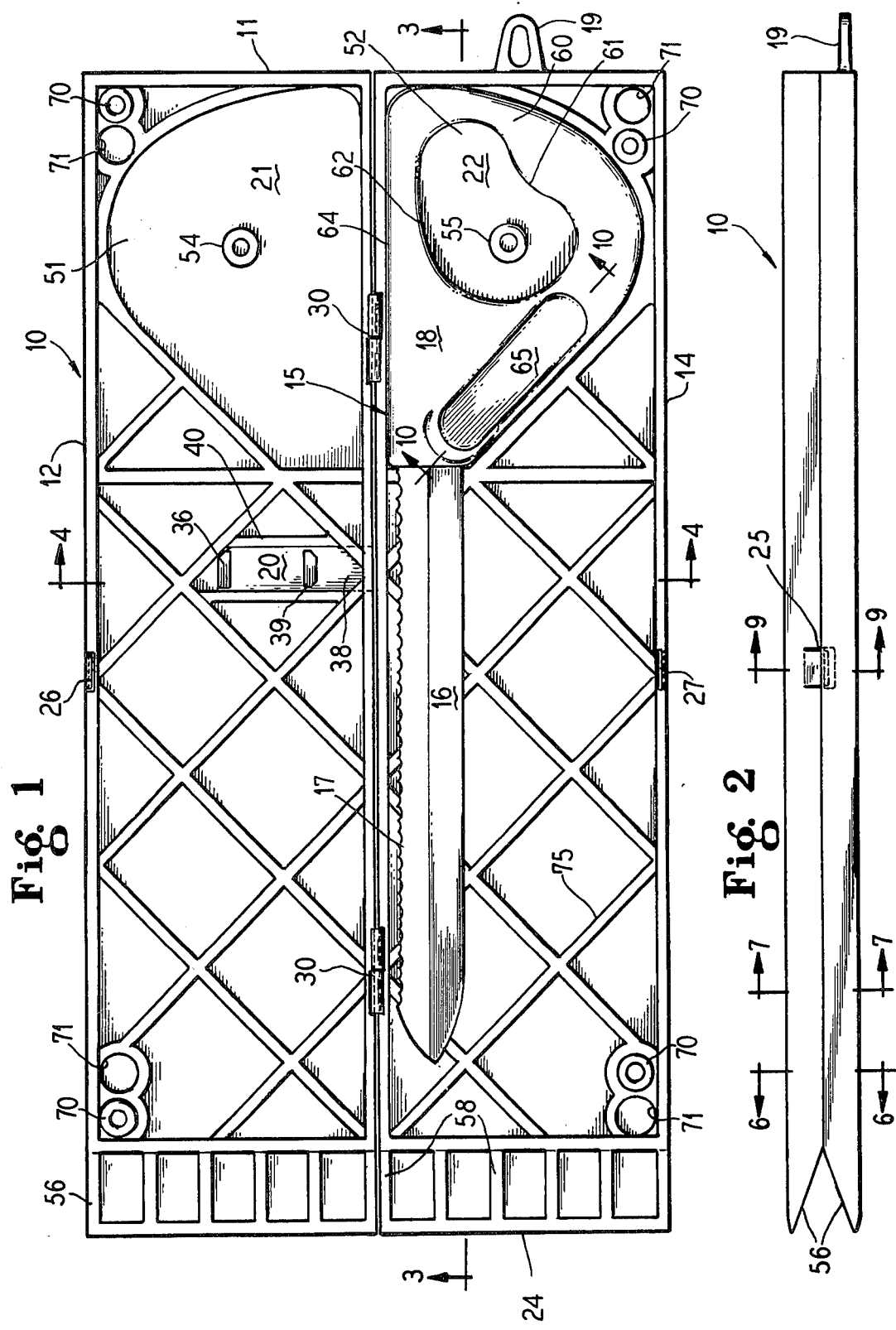

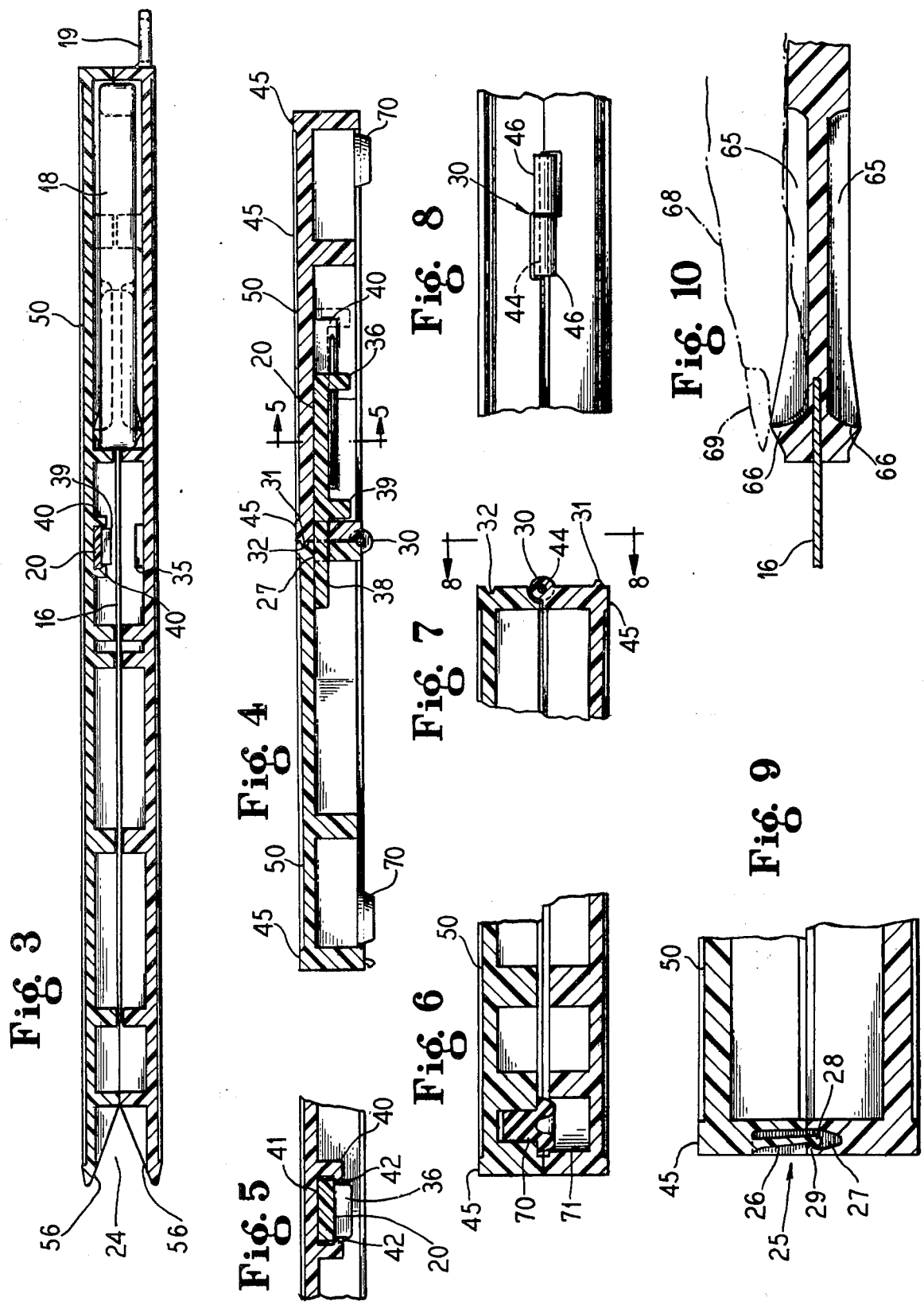

FOLDABLE CUTTING BOARD

RELATED APPLICATIONS

This application is a divisional application of application Ser. No. 683,479 filed May 5, 1976, now U.S. Pat. No. 4,015,330 issued Apr. 5, 1977.

FIELD OF THE INVENTION

The subject invention relates primarily to cutting boards finding utility in the kitchen, mobile homes, campers, and wherever foodstuffs are being prepared. The same may be classified in Class 30 Subclass 124, and one illustrative embodiment in which the cutting board is rigid and does not fold is disclosed in applicant's patent application Ser. No. 540,239 filed Jan. 10, 1975, now U.S. Pat. No. 3,955,278 issued May 11, 1976.

PRIOR ART

Cases for knives have been known for years, and many a carving set in the modern kitchen and dining room is kept in such a case. The case has little or no utility apart from providing a resting place, away from fingers and other cutlery, while the carving set is not in use. Hunting knives are well known and carried often times in leather cases. Cutting boards, on the other hand, take a wide variety of configurations, some with handles, and some without. Other cutting boards are built into kitchen counter tops. Wooden cutting boards often slide in and out beneath the kitchen counter top. Such cutting boards may or may not be easily cleansed through a trip to the dishwasher. Even though thin in cross-section, a cutting board is wide and normally occupies either a substantial space on the kitchen wall, or in a kitchen drawer, or in a slide as just discussed beneath the countertop. Cutting boards and knives find themselves used in combination without matching the set. In addition, the knife is normally kept at one location, and the cutting board at another thus requiring the homemaker to reach into a drawer which may have other knives, and thereby cause the risk of damage to the knife edge by contacting other metal surfaces, and also impose the risk of fingers being cut while dislodging the particular knife chosen at the time from other kitchen utensils.

SUMMARY

The subject cutting board folds down its center portion, and is formed with appropriate recesses therein to house a kitchen utensil, such as a knife intended for use with the cutting board. Latch means are provided for closing the case which is formed of two members, thereby reducing the size of the cutting board in half in its planar dimension for storage. A releasable lock secures the two halves, the same being hinged together for usage. A latch is provided for securing the two halves in their cutting board configuration, preferably in the form of a bolt. Stoppers are provided on the underportion of the cutting board to secure the same against dislodgment frictionally on top of a smooth counter. In addition, a hanger may be provided to hold the cutting board in its case configuration on a nail or other extension from a wall. A drip rib is provided at the centerfold of the cutting board to inhibit juices and fluids from draining through the center of the cutting board, and in addition, a drip rail is provided around the upper surface of the cutting board to prevent fluids from draining over the side. Preferably the cutting board is molded from a high density polyethylene with a pebble-like finish which permits the same to be cleaned in a dishwasher, and in addition, provides the cutting surface with a memory and bacterial resistant surface.

Accordingly, it is the principal object of the present invention to provide a cutting board in which a utensil, such as a knife, is stored within the cutting board while out of use.

A related and significant object of the present invention is to provide a cutting board which folds about its center portion, contains the utensil, and therefore, when stored, has a minimum bulk and will fit into small drawers and other confined spaces.

Another object of the present invention is to provide a cutting board which is molded essentially out of two separate pieces of material, inexpensively, and can be secured together by simple hinges. Forming the cutting board in this fashion permits the same to be economically mass produced.

Yet another object of the present invention is to provide a cutting board in which a knife is protected from damage inside the case when out of use, and when the unit is removed from a drawer or other storage space, the user's fingers are protected from the cutting edge of the knife.

Still another and more detailed object of the present invention is to provide a cutting board in which the cutting board has provision for frictionally engaging a surface after the same is opened.

Another object of the present invention is to provide a cutting board in which the cutting board is formed of two hinged adjacent members, and means are provided to channel juices, fluids, and other liquids atop the cutting board to retain the same on the top so that they can be readily removed, rinsed off with a faucet, or otherwise cleaned.

A more detailed object of the present invention is to provide a cutting board in which two halves of the cutting board are hinged together, and a latch means in the form of a finger actuated bolt may be moved to secure the cutting board in its operative relationship between the two halves.

Yet another object of the present invention is to provide a cutting board which can be wall mounted, and which utilizes a snap acting plastic molded hinge so that it can be readily opened for use.

In addition, the subject cutting board case and knife set, when the fingers are wet and difficulty may be experienced in releasing the snap acting catch, can be opened by holding the fingers adjacent the beveled front end portion which, when the case is closed, defines a V-shaped opening.

DESCRIPTION OF DRAWINGS

Further objects and advantages of the present invention will become aparent as the following description of an illustrative embodiment proceeds, taken in conjunction with the accompanying drawings in which:

FIG. 1 is a view of the subject cutting board case and knife with the two halves opened, and with the cutting surface of the cutting board positioned downwardly thereby revealing the position of the knife when nested within the cutting board as a case.

FIG. 2 is a view of one edge of the cutting board case and knife set when the same are releaseably secured in the closed configuration, and showing the releaseable lock or snap assembly facing the viewer.

FIG. 3 is a longitudinal transverse sectional view of the closed cutting board case and knife taken generally along section line 3—3 of FIG. 1, and in the same scale thereof, but showing the case closed in the configuration revealed in FIG. 2.

FIG. 4 is a transverse sectional view taken along section line 4—4 of FIG. 1 and in the same scale as shown there.

FIG. 5 is an enlarged partially broken sectional view through the latch means taken along section line 5—5 of FIG. 4.

FIG. 6 is a further enlarged partially broken transverse sectional view taken along section line 6—6 of FIG. 2 showing the stopper button and its relationship to its opposed button pocket.

FIG. 7 is a further enlarged partially broken transverse sectional view taken along section line 7—7 of FIG. 2 illustrating the construction of the hinge which joins the two edges and the drip bead configuration.

FIG. 8 is a broken front elevation and enlarged section of the hinge construction taken from the vantage point of 8—8 of FIG. 7.

FIG. 9 is a further enlarged transverse sectional view of the snap or releaseable lock assembly taken along section line 9—9 of FIG. 2.

FIG. 10 is an enlarged partially diagrammatic broken view of the knife handle illustrating the finger guides and other elements of the knife handle construction of the knife generally shown in plan view in FIG. 1.

DESCRIPTION OF PREFERRED EMBODIMENT

For the best understanding of the relationship between the elements of the cutting board case and knife assembly 10, the same is shown in its open position in FIG. 1, as it would be by the user when removing the knife 15 from the cutting board case and knife 10. The cutting board 11 is made up of two halves, a bolt half 12 and a latch half 14, the same being secured together by means of a hinge assembly 30 at the center portion of each. The knife 15, has a blade 16 and is shown with the preferable cutting edge 17 in the form of a serrated hollow ground double ground edge. The handle 18, as shown, includes a kidney shaped handle grip 60, having a closed handle opening 62. The details of the configuration of the handle 18, including the preferred material will be described in greater detail hereinafter.

To be noted, are the complementary recesses 21, 22 for the handle, in which the recesses 21, 22 have the configuration of the handle 18. While the handle has been shown in kidney shaped form herein, it will be appreciated that other handle configurations may be employed, including the typical longitudinal handle with knuckle grip portions, and in such a situation, the recesses 21, 22 are modified to conform to the same for being complementarily retained within the cutting board case 10. Also to be noted in FIGS. 1 and 2 is the provision of a hanger 19 by means of which the cutting board case and knife assembly 10 may be hung on a nail, hook, or other extension off of a vertical surface.

In order to secure the bolt half and latch half 12, 14 of the cutting board 11, a bolt 20 (see again FIG. 1) is provided, the bolt having a finger tab 36, and a bolt tongue 38, by means of which the finger tab 36 is actuated and the bolt tongue 38 extends into a latch pocket 35. More specifically, to be noted in conjunction with FIGS. 4 and 5, the bolt 20 is snap fittingly engaged within a bolt guide 40, having a channel 41 for receiving the same, and rails 42 for retaining the bolt 20 within the bolt guide 40. The bolt stop 39 engages a lateral edge of the bolt half 12 of the cutting board 11, when the bolt tongue 38 is fully nested within the latch pocket 27 (see FIG. 4). At this point the bolt tongue 28 completely penetrates the latch pocket 27, and its upper surfaces engages the underneath surface of the latch half 14 of the cutting board 11, thereby securing the same in locked cutting configuration. When this particular assembled relationship is achieved by actuating the bolt 20, as will be observed in FIG. 4, the drip bead 31 press fittingly engages the drip groove 32 opposite it, to seal the same from dripping juices and the like. The disengaged relationship between the drip bead 31 and drip groove 32 are shown in FIG. 7. Also to be noted in FIGS. 7 and 8, is the configuration of the hinge assembly 30 which is made up of a pair of hinge collars 46 which are semicircularly exposed (see FIG. 7) and secured each to the other by means of the hinge pin 44. A drip rail 45 is provided around the permiter of the cutting surface 50, and is also provided at the two adjacent faces of the bolt half 12 and latch half 14 of the cutting board, immediately above the drip bead and drip groove assembly 31, 32 and running down the center of the unit.

When the cutting board case and knife assembly 10 are closed, the closure is effected by the snap assembly 25, best shown in its details in FIG. 9. There it will be seen that a leaf latch 26 is provided for snapping into a leaf latch pocket 27. The two elements are inter-connected by means of the leaf latch hook 28 and the pocket hook 29 which overlappingly engage each other as shown in FIG. 9. The scoop end 24 (see FIGS. 1 & 2) define a scoop edge 56 with a V-shaped space therebetween as shown in FIG. 2. In the event the fingers are wet, and it is difficult to dislodge the snap assembly 25, the fingers can be inserted in the V-shaped groove 56 defined at the end of the case 10 when the same is closed, and pressed to the end that the snap assembly 25 disengages and the unit can be opened to its configuration as shown in FIG. 1 for removal of the knife.

Some of the additional details of construction are illustrated in FIG. 1 where it will be seen that the recess bases 51, 52 of the handle recesses 21, 22 are provided with support posts 54, 55 which will engage the flat counter surface upon which the cutting board 11 is placed in the event pressure is applied to the base sections 51, 52. The cutting board 11 is further reinforced by means of the lattice webbing 75 defining a plurality of square pockets in the underneath portions of the bolt half 12 and latch half 14 of the cutting board 11. In addition, the scoop end 24 is reinforced by means of a plurality of scoop ribs 58 so that the cutting board can be pushed against various loose foodstuffs and the same, often times in cooperation with the cutting knife 15, used to position the foodstuffs atop the cutting surface 50 of the cutting board 11. In addition, a plurality of stopper buttons, preferably rubber or similar material, are positioned at the four corners of the underneath side of the cutting board 11, and when closed, are engaged by adjacent end opposed button pockets 71, this relationship being as shown in detail in FIG. 6.

In the preferred embodiment of the cutting knife 15, the handle 18 is kidney shaped, as shown in FIG. 1. The handle is provided with a finger knob 61 which assists in gripping the handle grip portion 60. A flat base guide 64 is provided at the lower portion of the handle 18, and moves back and forth as a base on the cutting surface 50 when used. A pair of opposed finger guides 65 (see FIG.

1 and FIG. 10) are provided so that the finger 68 (see particularly FIG. 10 in phantom lines) fits within the finger guide 65, and the finger nail 69 can extend over the top of the raised ends 66 of the finger guides 65. To be further noted is that the knife handle 18 is equally adaptable to the hand of a left handed or a right handed user.

In manufacture, the blade 16 is preferably an 8 inch stainless steel blade having a thickness of approximately 0.050 inches. The cutting edge is known by the trademark Vari-Wave which continues to about the forward end of the knife radius, and terminates at the junction with the knife handle 18. The knife is preferably double hollow ground, and as shown has a serrated edge, but straight edge knives are also contemplated.

As referred to above, the cutting board 11 is preferably molded from high density polyethylene since it is soft enough to permit long life of the cutting edge of the knife 16. In addition, this plastic can be safely washed in a dishwasher, and the same is approved by the U.S. Department of Agriculture with respect to bacterial contamination. In addition, the memory of polypropylene is such that even if cuts are made in the cutting surface, the same will close upon usage. Preferably the upper face of the cutting surface 15 is pebble grained to prevent thinly sliced foodstuffs from sticking to the same by means of their related surface tensions. The knife handle, on the other hand, preferably molded of polypropylene, because the same is more rigid than polyethylene, and will accommodate greater temperature extremes as in the dishwasher, or adjacent a cooking surface where the knife may be inadvertently positioned.

Also to be noted is that the hinge assembly 30 (see FIG. 4) is dimensioned so that the same will not engage the adjacent counter surface, but rather the stopper buttons 70 engage the same. Also, from a standpoint of proportion, the elements of the hinge assembly are provided to provide a stop at the two ends of the cutting board halves 12, 14, as will be noted from FIG. 7. This abutting relationship of the ends, reinforced by means of the bolt 20, secure the cutting board 11 in a flat configuration for use as described.

In review it will be seen that a cutting board case and knife assembly 10 have been disclosed and described in which the knife 15 is carried within the two halves 12, 14 of the cutting board 11 when the same is out of use. This confers the twofold advantage of safety of the knife, and compaction of the cutting board for storage. In addition, the knife is protected from damage by other elements, and yet ready for immediate use when the cutting board is to be used since opening the cutting board 11 simultaneously exposes the knife 15 for its removal, and use. The elements can be readily molded from economically high engineered plastics which offer resistance to bacterial contamination, and ready cleansing through the household dishwasher.

Although particular embodiments of the invention have been shown and described in full here, there is no intention to thereby limit the invention to the details of such embodiments. On the contrary, the intention is to cover all modifications, alternatives, embodiments, usages and equivalents of a cutting board case and knife set as fall within the spirit and scope of the invention, specification and the appended claims.

What is claimed is:

1. A cutting board comprising:
  hinged opposed half portions,
  a cutting surface formed on correspondingly aligned opposed surfaces of said half portions,
  releasable lock means for holding both said half portions together when said half portions are disposed in folded relationship relative to each other,
  and latch means for securing said half portions when said half portions are opened in a cutting board configurations,
  said latch means having mutual releasing mutual interlocking members one of which traverses said hinged opposed half portions,
  whereby, when said cutting board is opened, said half portions lockingly form a rigid cutting surface.

2. In the cutting board of claim 1,
  a drip bead along an edge of one of said half portions of said cutting board,
  and a drip groove along the opposite edge of the other said half portion to press fittingly receive said bead,
  whereby fluids are inhibited from passing through the joint between said two half-portions.

3. In the cutting board of claim 1,
  a utensil recess within said halve portions,
  said utensil recess opposed said cutting surface,
  whereby, when said case is folded about its hinges, said halves are disposed in utensil encasing relationship to each other.

4. In the cutting board of claim 1,
  a knife handle recess within said half portions,
  said knife handle recess opposed said cutting surface,
  whereby, when said case is folded about its hinges, said halves are disposed in knife encasing relationship to each other.

5. In the cutting board of claim 1,
  said interlocking members including a sliding bolt and a latch recess,
  said sliding bolt disposed in one of said half portions of said cutting board,
  and said latch recess positioned in the other said half portion of said cutting board to receive said sliding bolt.

6. In the cutting board of claim 5,
  said sliding bolt having a finger tab.

7. In the cutting board of claim 5,
  a bolt guide having a channel disposed in bolt retaining relation to said sliding bolt.

8. In the cutting board of claim 7,
  said channel having a pair of rails cooperatively positioned in retaining relation to opposite lateral sides of said sliding bolt.

9. In the cutting board of claim 1,
  a recessed edge portion integrally formed on at least one of said half portions,
  said recessed edge portion of one said half portion disposed immediately adjacent to said other half portion when said cutting board is folded.
  whereby said releasable lock means may be pried open.

10. In the cutting board of claim 1,
  an opposed recessed edge portion integrally formed on each of said half portions,
  said opposed recessed edge portions define a cavity therebetween when said cutting board is folded,
  whereby said releasable lock means may be pried open.

11. In the cutting board of claim 10,
  each said recessed edge portion comprising an opposed beveled end, said beveled end from said cutting surface extending downwardly and outwardly, said opposed beveled ends define a V-shaped space therebetween when said cutting board is folded, whereby said opposed beveled edges form a scoop when said cutting edge is open.

12. In the cutting board of claim 1, said opposed half portions having a lattice webbing defining a plurality of square pockets.

13. In the cutting board of claim 11, said beveled end having a plurality of parallel ribs disposed in substantially parallel relationship to the hinged edges of said opposed half portions.

14. In the cutting board of claim 1, a plurality of stopper buttons with at least one in four corners of an opened cutting board.

15. In the cutting board of claim 1, said releasable lock means comprising a snap assembly having a leaf latch and a leaf latch pocket, said leaf latch disposed in one of said half portions of said cutting board, and said leaf latch pocket positioned in the other said half portion to receive said sliding bolt.

16. A cutting board comprising;

hinged opposed half portions, a cutting surface formed on correspondingly aligned opposed surfaces of said half portions, snap assembly for holding both said half portions together when said half portions are disposed in folded relationship relative to each other, and latch means for securing said half portions when said half portions are opened in a cutting board configuration, said latch means having mutual releasing mutual interlocking members one of which transverses said hinged opposed half portions, whereby, when said cutting board is opened, said half portions lockingly form a rigid cutting surface, each said half portions having an opposed beveled end extending downwardly and outwardly from said cutting surface, said opposed beveled ends define a V-shaped spaced therebetween when said cutting board is folded, whereby said opposed beveled edges form a scoop when said cutting edge is open.

17. In the cutting board of claim 16, a drip bead along an edge of one of said half portions of said cutting board, and a drip groove along the opposite edge of the other said half portion to press fittingly receive said bead, whereby fluids are inhibited from passing through the joint between said two half-portions.

18. In the cutting board of claim 16, a utensil recess within said halve portions, said utensil recess opposed said cutting surface, whereby, when said case is folded about its hinges, said halves are disposed in utensil encasing relationship to each other.

19. In the cutting board of claim 16, said interlocking members including a sliding bolt and a latch recess, said sliding bolt disposed in one of said half portions of said cutting board, and said latch recess positioned in the other said half portion of said cutting board to receive said sliding bolt.

* * * * *